(12) United States Patent
Taylor et al.

(10) Patent No.: US 9,944,268 B2
(45) Date of Patent: Apr. 17, 2018

(54) ELECTRONIC DRIVE SYSTEM FOR A RIDE-ON TOY VEHICLE

(71) Applicant: Mattel, Inc, El Segundo, CA (US)

(72) Inventors: John W. Taylor, Cowlesville, NY (US); Peter Truman vom Scheidt, Jr., Elma, NY (US); JonPaul Warriner, Farmington, NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 15/093,115

(22) Filed: Apr. 7, 2016

(65) Prior Publication Data

US 2016/0296848 A1  Oct. 13, 2016

Related U.S. Application Data

(60) Provisional application No. 62/144,604, filed on Apr. 8, 2015.

(51) Int. Cl.
| | |
|---|---|
| *B62K 9/00* | (2006.01) |
| *B62K 9/02* | (2006.01) |
| *B60L 3/00* | (2006.01) |
| *B60L 15/20* | (2006.01) |
| *B60W 10/00* | (2006.01) |

(52) U.S. Cl.
CPC ......... *B60W 10/00* (2013.01); *B60L 3/0092* (2013.01); *B60L 2200/20* (2013.01); *B60L 2220/42* (2013.01); *B60L 2240/421* (2013.01); *B60L 2240/461* (2013.01); *B60L 2260/54* (2013.01); *Y02T 10/648* (2013.01)

(58) Field of Classification Search
CPC . A63C 17/12; A63C 2203/12; A63C 2203/22; A43B 3/0005; B62K 9/00; B62K 9/02; B62K 2204/00; B60L 3/00; B60L 3/08; B60L 15/20; B60L 2240/12; B60L 2200/20; B60L 11/1805
See application file for complete search history.

(56) References Cited

U.S. PATENT DOCUMENTS

| | | | |
|---|---|---|---|
| 2,438,010 A * | 3/1948 | King | H02P 5/685 318/142 |
| 4,639,646 A * | 1/1987 | Harris | B60L 11/1805 318/139 |
| 5,341,453 A | 8/1994 | Hill | |
| 5,349,276 A | 9/1994 | Mezzatesta, Jr. et al. | |
| 5,816,352 A * | 10/1998 | Hacker | A63G 25/00 180/167 |
| 6,287,167 B1 | 9/2001 | Kondo | |
| 6,470,982 B2 | 10/2002 | Sitarski et al. | |

(Continued)

FOREIGN PATENT DOCUMENTS

JP    2013061041 A    4/2013

OTHER PUBLICATIONS

Lukitsch, Walter J., Senior Member IEEE, Soft Start Vs AC Drives—Understand the Differences, Allen-Bradley Company, Milwaukee, WI, pp. 1-5.

(Continued)

*Primary Examiner* — Bryan A Evans
(74) *Attorney, Agent, or Firm* — Edell, Shapiro & Finnan, LLC

(57) ABSTRACT

Embodiments of the present invention relate to an electronic drive system for a battery powered ride-on toy vehicle.

21 Claims, 15 Drawing Sheets

(56) References Cited

U.S. PATENT DOCUMENTS

| | | | |
|---|---|---|---|
| 6,860,512 B2 | 3/2005 | Lawson, Jr. | |
| 7,298,103 B2 | 11/2007 | Denen et al. | |
| 8,164,429 B2 | 4/2012 | Reynolds et al. | |
| 8,366,135 B2 | 2/2013 | Asbach et al. | |
| 2002/0104695 A1* | 8/2002 | Sitarski | A63G 25/00 180/65.1 |
| 2002/0113564 A1* | 8/2002 | Reile | A63G 25/00 318/139 |
| 2006/0192506 A1 | 8/2006 | Miffit et al. | |
| 2007/0246271 A1 | 10/2007 | Lucas et al. | |
| 2008/0264703 A1 | 10/2008 | Asbach et al. | |

OTHER PUBLICATIONS

Juan Dixon, et al., Performance Characteristics of the First, State-of-the-Art Electric Vehicle Implemented in Chile, Department of Electrical Engineering, Catholic University of Chile, University of Concepcion, 8 pages.

Chan, CH, et al., DSP Controlled Power Converter, The HKU Scholars Hub, The University of Hong Kong, Proceedings of the International Conference on Power Electronics and Drive Systems, 1995, v. 1, p. 364-369.

Gordon Stout, B.S.M.E., Assistant Development Engineer, Some Aspects of High Performance Indoor/Outdoor Wheelchairs, Biomechanics Laboratory, University of California, Berkeley, Bull. Prosth. Res., BPR 10-32, Fall 1979, pp. 135-175.

Sougata Nandi et al., An AC Drive System for a Battery Driven Moped, Energy Systems Engineering, Indian Institute of Technology, India, Sep. 22, 1995, pp. 734-740.

N. Godoy Simoes, et al., ‚Drive System Control and Energy Management of a Solar Powered Electric Vehicle, University of Sao Paulo, EPUSP-PMC, Brazil, 1998 IEEE, pp. 49-55.

S.H. Penzin et al., The Seu in Pulse Width Modulation Controllers with Soft Start and Shutdown Circuits, The Aerospace Corporation, El Segundo, CA, 1997 IEEE, pp. 73-79.

Iftikhar A. Khan, DC-to-DC Converters for Electric and Hybrid Vehicles, AC Delco Systems Division, General Motors Corporation, Anderson, IN, pp. 113-122.

Kunrong Wang, et al., Operation Principles of Bi-directional Full-Bridge DC/DC Converter with Unified Soft-Switching Scheme and Soft-Starting Capability, Virginia Power Electronics Center, The Bradley Depart. of Electrical Engineering, VA Polytechnic Institute and State Univ., 2000 IEEE, pp. 111-118.

Udaykumar R.Y., Battery Operated Two Wheeler, Dept. of Energy Systems Engineering, Dept. of Electrical Engineering, Department of Chem., Indian Institute of Tech., India, 1998 IEEE, pp. 906-910.

Kunrong Wang, et al., Design, Implementation, and Experimental Results of Bi-Directional Full-Bridge DC/DC Converter with Unified Soft-Switching Scheme and Soft-Starting Capability, Virginia Power Electronics Center, The Bradley Depart. of Electrical Engineering, VA Polytechnic Institute and State Univ., 2000 IEEE, pp. 1058-1063.

* cited by examiner

US 9,944,268 B2

ELECTRONIC DRIVE SYSTEM FOR A RIDE-ON TOY VEHICLE

CROSS-REFERENCE TO RELATED APPLICATIONS

This application claims priority to U.S. Provisional Application No. 62/144,604 entitled "ELECTRONIC DRIVE SYSTEM FOR RIDE-ON TOY VEHICLE," filed Apr. 8, 2015, the content of which is hereby incorporated by reference herein.

FIELD OF THE INVENTION

The present invention relates to an electronic drive system for a battery powered ride-on toy vehicle.
BACKGROUND
A toy ride-on vehicle is a reduced-scale vehicle that is configured to be ridden and operated by a child. For example, a toy ride-on vehicle may include a seat adapted to accommodate one or more children and steering and drive assemblies that are adapted to be operated by a child sitting on the seat. One type of drive assembly that is often used in toy ride-on vehicles includes a battery-powered motor assembly that is adapted to drive one or more of the vehicle's wheels. Typically, the vehicle will include an actuator, such as a foot pedal or other user input device that enables a child to select when power is delivered to the motor assembly.

SUMMARY

Embodiments of the present invention relate to an electronic drive system for a battery powered ride-on toy vehicle.

BRIEF DESCRIPTION OF THE DRAWINGS

Like reference numerals have been used to identify like elements throughout this disclosure.

DETAILED DESCRIPTION

Figure 1:
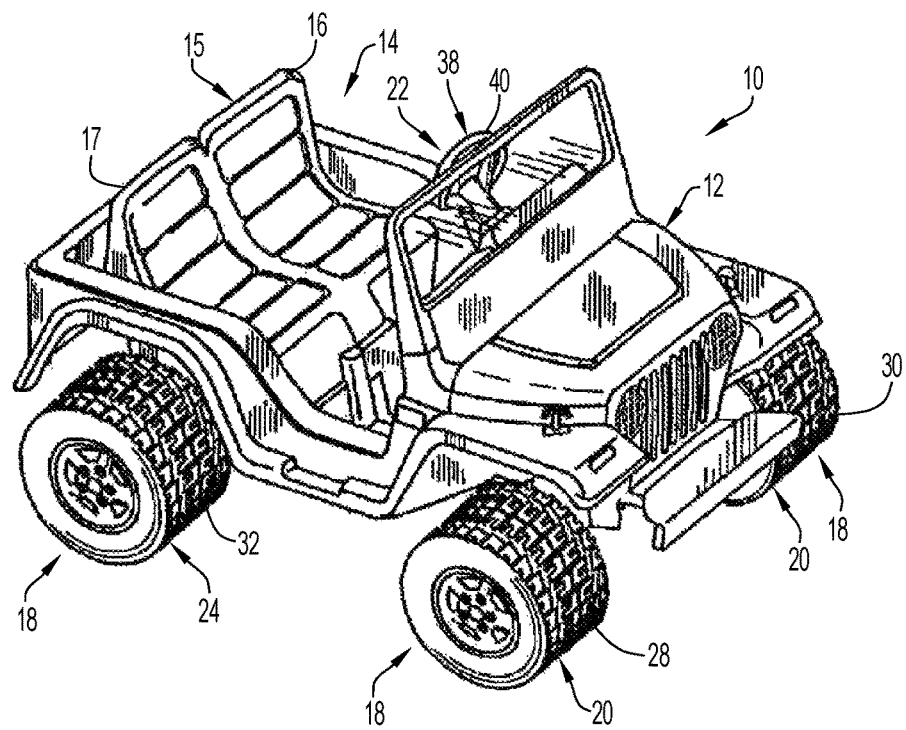
FIG. 1 illustrates an isometric view of a toy ride-on vehicle.
Figure 2:
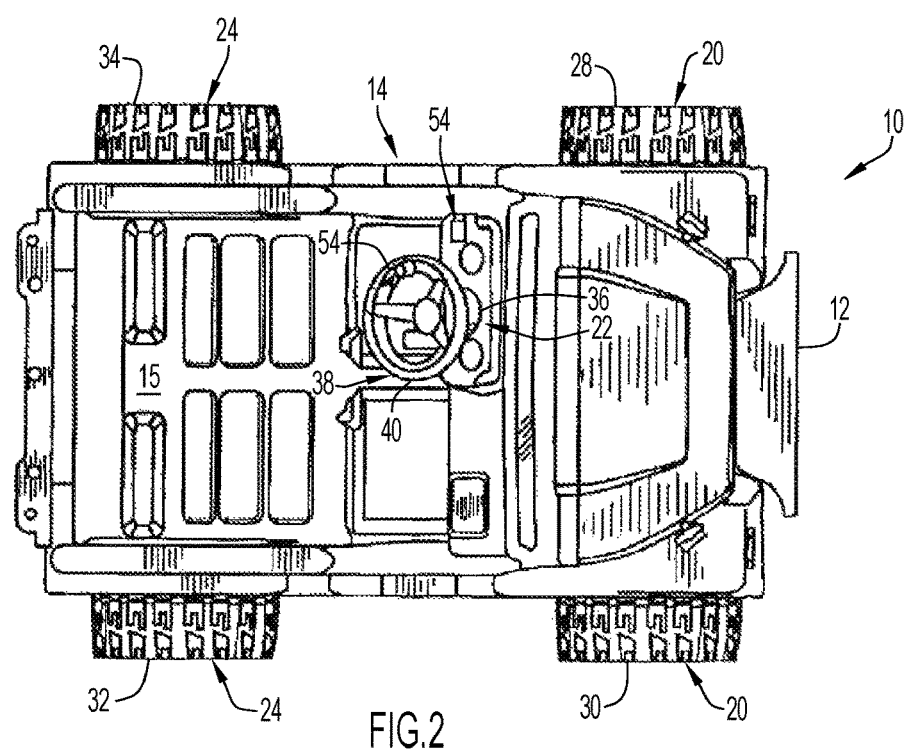
FIG. 2 is a top plan view of the toy ride-on vehicle of FIG. 1.

A toy ride-on vehicle is shown in FIGS. 1 and 2 and is indicated generally by reference numeral 10. The ride-on toy vehicle 10, referred to herein simply as a "vehicle," includes a body 12 that provides a riding space, or passenger compartment, 14 with a seat assembly 15 that is sized to accommodate at least one child, including a child driver. Seat assembly 15 may be integral with or otherwise mounted on body 12 and may have any suitable configuration, including configurations in which the position of the seat assembly is adjustable within the passenger compartment, and configurations in which the seat assembly includes two or more seats or two or more seating regions. Typically, vehicle 10 will be sized for use either by a child driver or by a child driver and a child passenger. For example, in the illustrated embodiment, seat assembly 15 includes a pair of seats, or seating regions, 16 and 17, with seat 16 sized and positioned to receive a child driver and seat 17 sized and positioned to receive a child passenger.

Body 12 typically is formed from molded plastic and may be integrally formed or formed from a plurality of parts that are secured together by screws, clips or other suitable fasteners. Alternatively, body 12 may be made of some other suitable material including metal, wood, or composite structure having suitable strength to accommodate and support the weight of at least one child. Body 12 may include an underlying frame on which a chassis is mounted. In such an embodiment, the frame is often formed of metal and/or molded plastic, with the chassis formed of molded plastic.

As shown, body 12 is shaped to generally resemble a reduced-scale Jeep® vehicle. Jeep® is a registered trademark of FCA US LLC. However, it should be understood that a toy ride-on vehicle according to the present invention may be shaped to generally resemble any type of vehicle. Examples of suitable vehicles are reduced-scale or child-sized vehicles that are shaped to resemble corresponding full-sized, or adult-sized, vehicles, such as cars, trucks, construction vehicles, emergency vehicles, off-road vehicles, motorcycles, space vehicles, aircraft, watercraft and the like. When a toy ride-on vehicle is sized and shaped to generally resemble an adult-sized vehicle, its body and/or other components will often generally resemble corresponding components on the full-sized vehicle. However, it is also within the scope of the present invention that vehicle 10 may be shaped to resemble fantasy vehicles that do not have a corresponding adult-sized counterpart.

As shown in FIG. 1, vehicle 10 also includes a plurality of wheels 18 that are rotatably coupled to body 12. The plurality of wheels first comprise a steerable wheel assembly 20 that includes at least one wheel adapted to be steered by the vehicle's steering assembly 22, typically at least partially in response to user inputs thereto (e.g., the front two wheels). The plurality of wheels also includes a driven wheel assembly 24 that includes at least one wheel adapted to be rotationally driven by a motor assembly (not shown in FIGS. 1 and 2) controlled by the vehicle's electronic drive system (also not shown in FIGS. 1 and 2). It should be understood that the term "driven wheel" refers to a wheel that is rotated directly in response to a rotational input from the vehicle's motor assembly, which is either directly conveyed to the wheel by the output of the motor assembly or conveyed through a linkage, such as a gearbox, belt, chain, gear assembly, axle, or the like. In the illustrated embodiment, vehicle 10 includes four wheels 18, with forward wheels 28 and 30 forming steerable wheel assembly 20, and rear wheels 32 and 34 forming driven wheel assembly 24. It should also be understood that the number of wheels on the vehicle may vary from two wheels to four, six or more wheels, although toy ride-on vehicles typically include at least three wheels for stability. In certain embodiments, the wheels may be replaced by, or used in conjunction with, other mechanisms such as one or more treads or tracks (e.g., in a snowmobile or bulldozer toy vehicle).

In the example of FIGS. 1 and 2, each wheel assembly contain at least one wheel, and a particular wheel may form all or a portion of both the steerable wheel assembly and the driven wheel assembly. For example, it is within the scope of the invention that either or both of front wheels 28 and 30 or rear wheels 32 and 34 are driven and steerable (e.g., rear wheels 32 and 34 may each be drive by different motors forming part of the same or different drive assembly). Similarly, one front wheel and one rear wheel may be driven and/or steerable, or the vehicle may include one or more driven or steerable wheels underneath its body that are generally hidden by the body of the vehicle. In further embodiments, the only wheel may be driven, or more than two wheels may be driven.

A portion of the vehicle's steering assembly 22 is shown in FIGS. 1 and 2 and includes a steering column 36 and a steering mechanism 38. The steering assembly 22 enables a child sitting on seat 16 to steer the vehicle's steerable wheel assembly 20 via user-applied steering inputs to steering mechanism 38, which is positioned on vehicle 10 for operation by a child sitting on seat 16. In the illustrated embodiment, steering mechanism 38 takes the form of a steering wheel 40. It should be understood that other suitable structures, such as handlebars and steering levers may be used in other embodiments. Steering column 36 includes any suitable mechanical linkage that conveys a child's steering inputs from the steering mechanism to the vehicle's steerable wheel assembly, thereby steering the vehicle.

Figure 3:
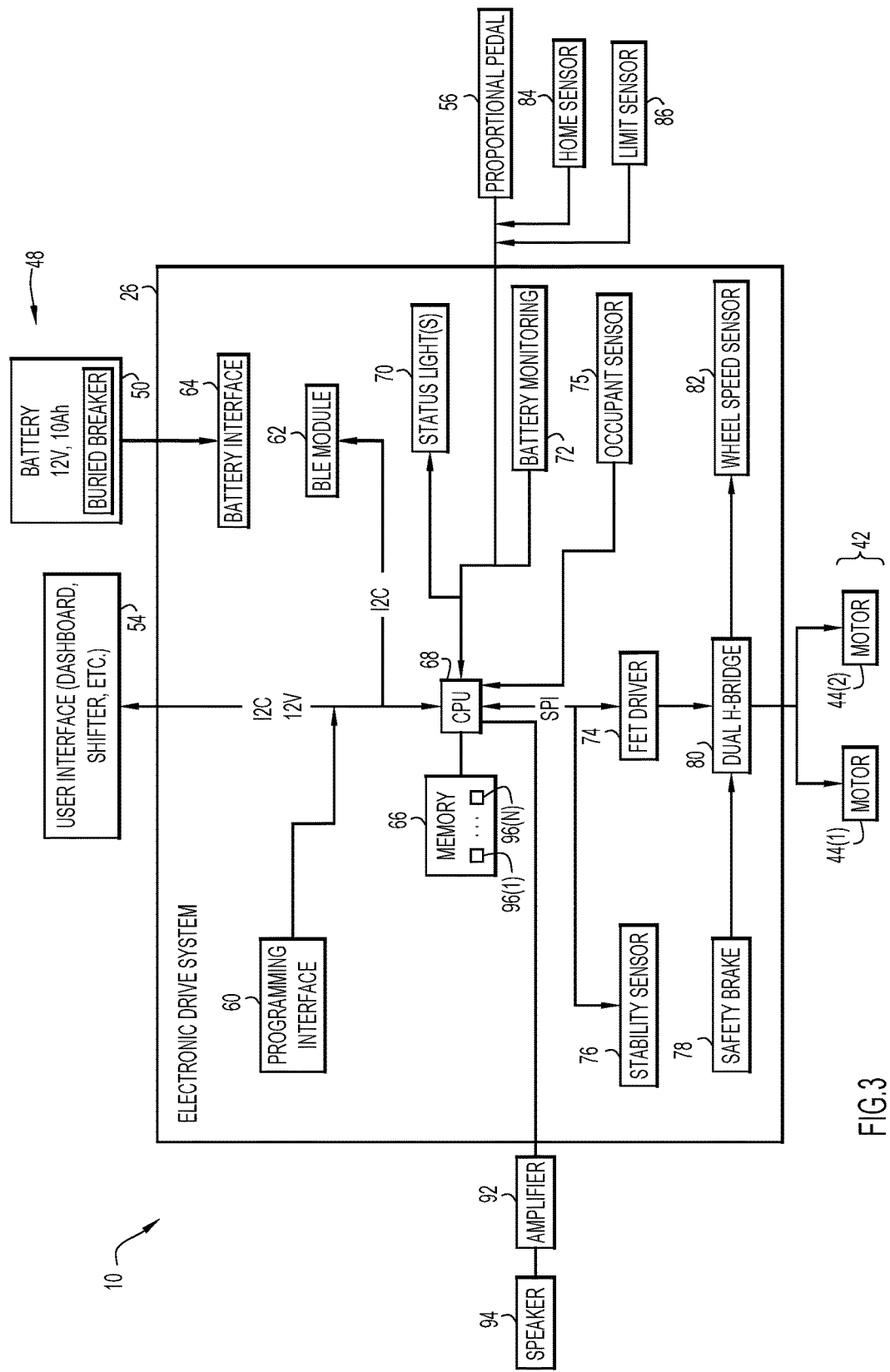
FIG. 3 is a block diagram of the toy-ride on vehicle of FIGS. 1 and 2.

FIG. 3 is block diagram that schematically illustrates, among other elements, an electronic drive assembly 26 and a motor assembly 42 of vehicle 10. As described further below, electronic drive assembly 26 is configured to supply electrical signals to motor assembly 42 to drive the driven wheel assembly 24. The motor assembly 42 includes first and second motors 44(1) and 44(2) and one or more drive mechanisms (not shown in FIG. 3) that transmit rotational forces to the driven wheel assembly 24. The drive mechanism from each of the motors 44(1) and 44(2) may be, for example, a rotating shaft and/or a rotation pinion or output gear.

Also shown in FIG. 3 is a battery assembly 48 that includes at least one battery 50 adapted to provide power for the vehicle 10. Any suitable rechargeable or disposable battery or batteries may be used as part of the battery assembly 48 (e.g., one or more six-volt, twelve-volt, eighteen-volt or twenty-four-volt batteries). In one specific arrangement, the battery assembly 48 includes a single twelve-volt rechargeable battery 50.

Further shown in FIG. 3 is a user interface 54 that includes one or more user input/control devices that covey inputs from a user (e.g., a child sitting on seat 16, a parent/caregiver, etc.) to the electronic drive system 26 or that provide information to the user. As described further below, inputs received at user input devices forming part of the user interface 54 may alter/control the operation of the vehicle 10. For example, the user interface 54 may include an "on" or "ignition" button that energizes the electronic drive system 26 and the motor assembly 42. Other user input devices may be used to select between a range of electronic configurations, select the direction of rotation of the motor assembly's output (i.e., forward or reverse), selecting the relative degree of a maximum rate of rotation to which the motor assembly is actuated, etc.

The vehicle 10 includes one or more proportional control drive actuators 56 that include a foot pedal, one or more throttle levers, a rotational handgrip on a steering mechanism that includes a handlebar, or other moveable/acuatable component/mechanism. The one or more proportional control drive actuators 56 are referred to as providing "proportional control" because the actuators are configured have multiple input levels (i.e., are analog, rather than digital inputs). Stated differently, a proportional control drive actuator 56 in accordance with embodiments of the present invention is configured to provide an indication of the amount/degree that the associated moveable component has been activated by a user (child) of the toy vehicle 10. As described further below, the amount that the moveable component of a proportional control drive actuator 56 has been activated is then used to set a speed of the toy vehicle motor(s).

In one example, the proportional drive actuator 56 is a proportional foot pedal (proportional pedal) positioned for actuation by a child sitting on seat 16. However, when drive actuator 56 takes a form other than a proportional pedal, it may be located in any suitable location within or near passenger compartment 14 so that a child sitting on seat 16 may reach the actuator. Further details of an example proportional pedal are provided below.

In general, the electronic drive system 26 is the operational control entity for the toy vehicle 10. The electronic drive system 26 comprises a programming interface 60, a wireless communication module 62 (e.g., a Bluetooth® Low Energy (BLE) module), a battery interface 64, a memory 66, at least one processor (e.g., central processing unit (CPU)) 68, one or more status lights 70, a battery monitoring circuit 72, a field-effect transistor (FET) driver 74, an occupant sensor 75, a stability sensor 76, an electronic safety brake 78, a dual H-bridge 80, and an indirect wheel speed sensor 82. Bluetooth® is a registered trademark of the Bluetooth® Special Interest Group (SIG). The operation of various elements of electronic drive system 60 is described in greater detail below.

The electronic drive system 26 actuates the motor assembly 42 (i.e., drive motors 44(1) and 44(2)) via the dual H-bridge 80 circuit (motor driving circuit allowing both forward and reverse motor operation). The electronic drive system 26 supplies drive signals to the dual H-bridge circuit 80, and thus to motor assembly 42, based on inputs received from proportional pedal 56. In one example, the electronic drive system 26 is configured to perform a "soft-start" technique designed to reduce or eliminate a sudden/jerky start of the vehicle 10. The soft-start uses intermediate/transition signals to ramp up the speed of the motors 44(1) and 44(2) over a period of time. The transition signals can be pulse width modulated (PWM) signals that are generated based on the signals received from the proportional pedal 56. The pulse width of the transition signals increases from, for example a duty cycle of 20 percent to 100 percent to provide for a controlled acceleration.

Figure 4A:
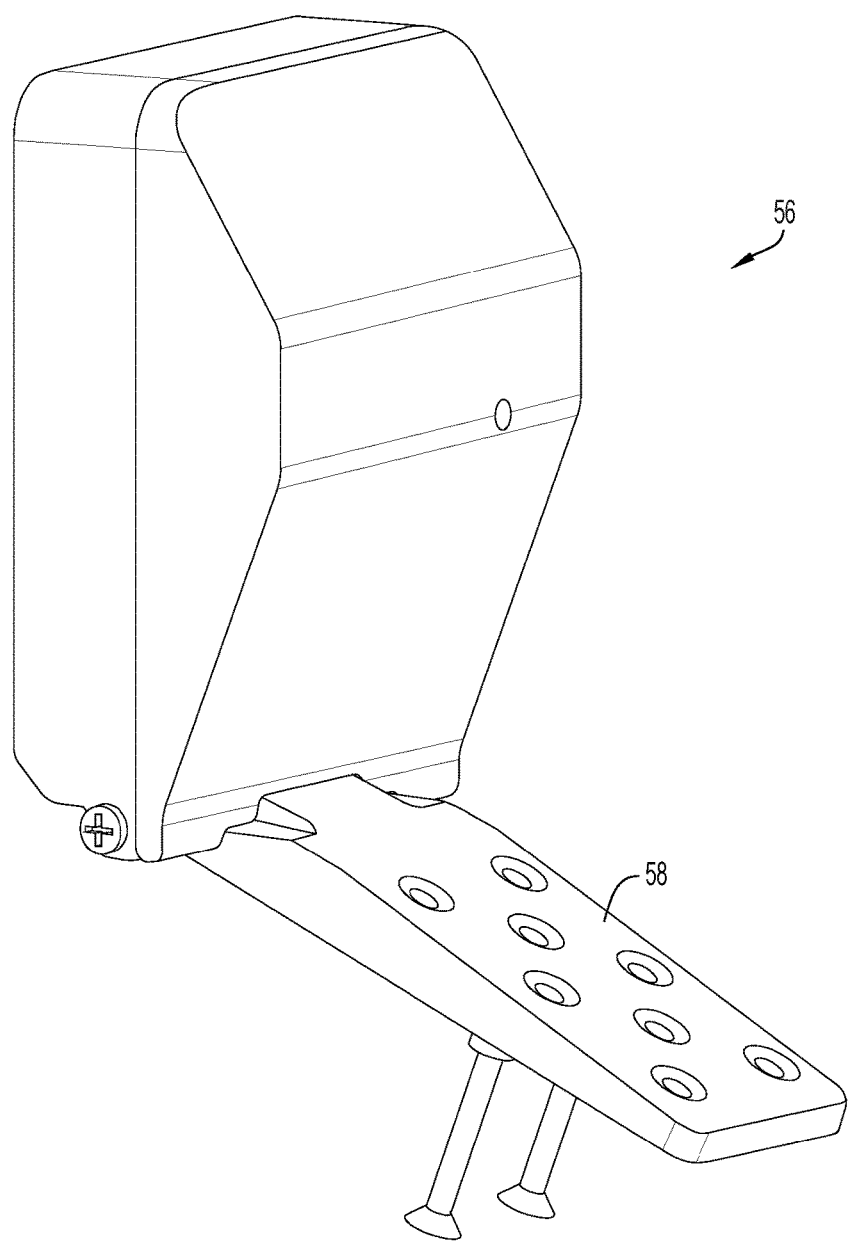
FIG. 4A is a perspective view of a proportional pedal in accordance with embodiments presented herein.
Figure 4B:
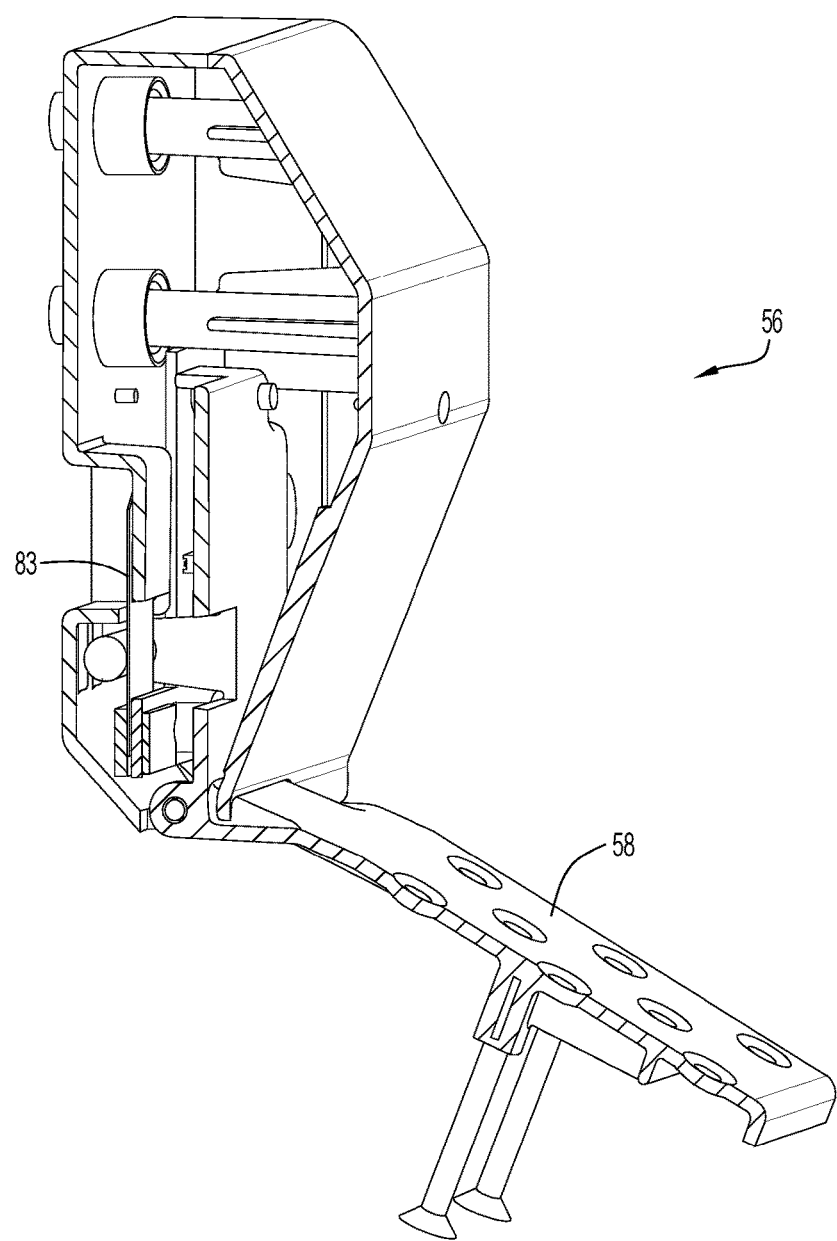
FIG. 4B is a cross-sectional view of the proportion pedal of FIG. 4A.

FIGS. 4A and 4B are perspective and cross-sectional views, respectively, of an example arrangement for a proportional control drive actuator in the form of proportional pedal 56. As shown, the proportional pedal 56 comprises a moveable component in the form of a pedal mechanism 58 that may be depressed by a child sitting in seat 16 (FIGS. 1 and 2). As noted, the proportional pedal 56 is configured to provide a "proportional" output to the CPU 68, meaning that the proportional pedal can provide an indication of the amount that the pedal mechanism 58 (moveable component) has been actuated (e.g., pushed) by the child. More specifically, the proportional pedal 56 includes an analog sensor 83 that is mechanically coupled to the pedal mechanism 58 so as to sense the amount/degree of travel of the pedal mechanism 58. The analog sensor 83 is electrically connected to the CPU 68 of the electronic drive system 26 so as to provide the CPU with a real-time indication of the amount/degree the pedal mechanism 58 has been depressed by the child.

In the specific arrangement of FIGS. 4A and 4B, the analog sensor 83 is a Bend Sensor® produced by Flexpoint Systems (Flexpoint). Bend Sensor® is a registered trademark of Flexpoint, Inc. The Bend Sensor® 83 is a potentiometer product comprising a coated substrate (e.g., plastic) that changes its electrical conductivity (e.g., resistance) as it is bent. Therefore, by measuring the electrical conductivity of the Bend Sensor® 83, the CPU 68 can determine the amount that the pedal mechanism 58 has been depressed. In certain examples, the "degree" or "amount" that the pedal mechanism 58 has been depressed is a percentage of the total available travel of the pedal mechanism.

FIG. 4B illustrates an arrangement in which the Bend Sensor® 83 is in a resting (i.e., non-bent) state. In FIG. 4B, the pedal mechanism 58 is fully non-depressed and the Bend Sensor® has a baseline electrical conductivity. In operation, the pedal mechanism 56 will first be partially depressed by the child and, accordingly, the Bend Sensor® 83 will be partially bent. The child can further actuate the pedal mechanism 56 until the pedal is fully depressed, thus causing the Bend Sensor® 83 to be fully bent.

As noted, the Bend Sensor® 83 is one illustrative arrangement that may be used for analog sensing associated with pedal mechanism 58 or another proportional control drive actuator. It is to be appreciated that, in other embodiments, the Bend Sensor® may be replaced with another analog sensor that enables the CPU 68 to determine the amount that the pedal mechanism 58 has been depressed.

Figure 4C:
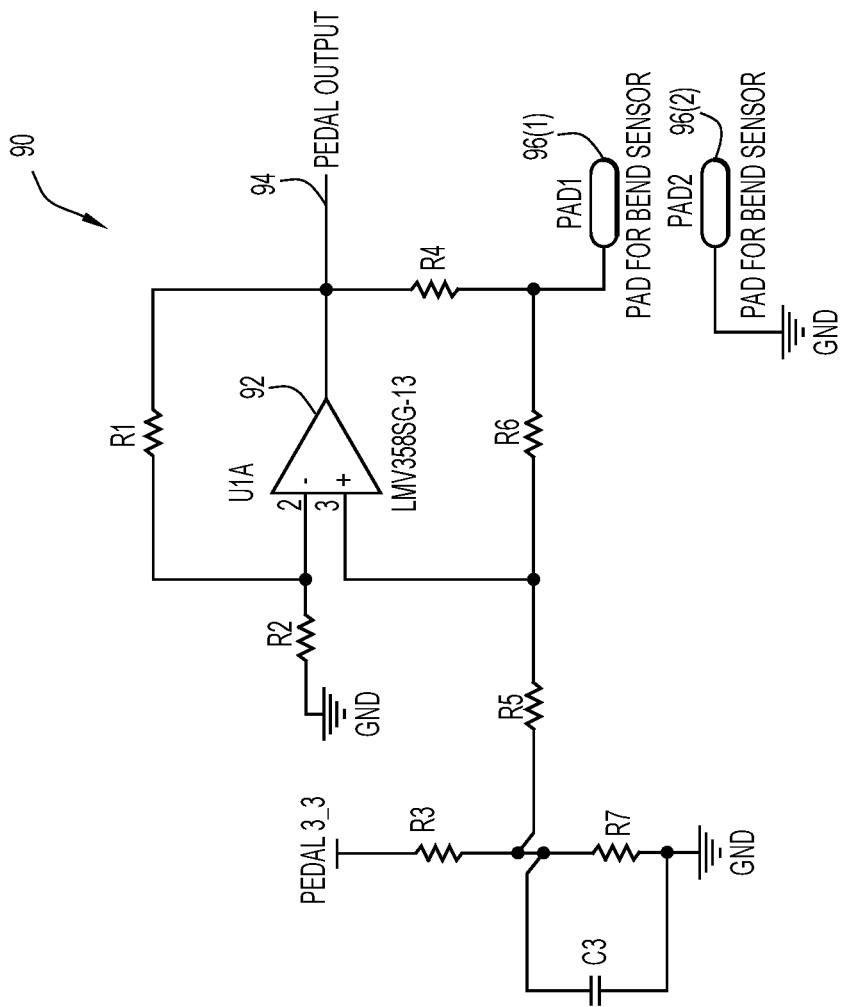
FIG. 4C is a schematic diagram illustrating an analog sensor circuit associated with a proportional pedal in accordance with embodiments presented herein.

FIG. 4C is a schematic diagram illustrating one arrangement for an analog sensor circuit 90 associated with the proportional pedal 56 (e.g., a circuit forming part of the proportional pedal). As shown, the analog sensor circuit 90 comprises an operational amplifier 92 generating a pedal output 94. Also shown in FIG. 4C are pads 96(1) and 96(2) for connection to an analog sensor 83, such as Bend Sensor® 83. In the illustrative arrangement of FIG. 4C, the analog sensor circuit 90 operates as a constant current source circuit where the operational amplifier 92 delivers a variable voltage so as to maintain a constant current through the Bend Sensor® 83 as the electrical conductivity changes. More specifically, as the electrical conductivity of the Bend Sensor® 83 (e.g., resistance increases), the voltage delivered by the operational amplifier 92 also increases so as to maintain the constant current. The increase in voltage is detected as the pedal output 94 and used by the CPU to determine the amount the pedal mechanism 58 has been depressed.

It is to be appreciated that the analog sensor circuit 90 is merely one illustrative arrangement for a circuit associated with a proportional pedal. As such, it is to be appreciated that other circuit arrangements are possible and are within the scope of the present invention. It is also to be appreciated that more than one analog sensor circuit may be used in alternative arrangements. For example, in arrangements in which the one or more proportional control drive actuators comprise two hand-activated controls (e.g., the pedal 56 is replaced by two handles), there may be one analog sensor circuit associated with each of the hand-activated controls.

In addition to the analog sensor 83, the proportional pedal 56 is also associated with a home sensor 84 and a limit or end-of-travel sensor 86, both of which are shown in FIG. 3. The home sensor 84 is configured to activate (i.e., generate an output) when the analog sensor 83 (and thus the pedal mechanism 58) is in a resting position (i.e., when the pedal is not engaged), and to deactivate when the pedal is pressed. The transition of the home sensor 84 from active to deactivate (e.g., from open to closed in an arrangement in which the sensor 84 is a switch), or vice versa, is detectable by the electronic drive system 26 and may be used to implement one or more auxiliary mechanisms. For example, the home sensor 84 may be used to determine when the pedal mechanism 58 has returned to an upright position, to trigger the CPU 68 to start reading the analog sensor 83, etc.

The limit sensor 86 may be actuated when the pedal mechanism 58 reaches it maximum displacement (i.e., when the pedal mechanism has been fully engaged). This limit sensor 86 may be used to determine, for example, when the pedal mechanism 58 is incorrectly held in a fully engaged position. The limit sensor 86 also provides an indication of the ultimate limit of the analog sensor 83. This information, coupled with the information from the home switch 84, may enable recalibration of the analog sensor 83, if needed.

The sensors 84 and 86 provide outputs that may be used in combination with the analog output of the analog sensor 83. In one example, the sensors 84 and 86 are formed by Hall Effect sensors and magnets. In other examples, the sensors 84 and 86 are formed by switches or another mechanism configured to recognize a start/stop of the pedal mechanism 58.

Figure 4D:
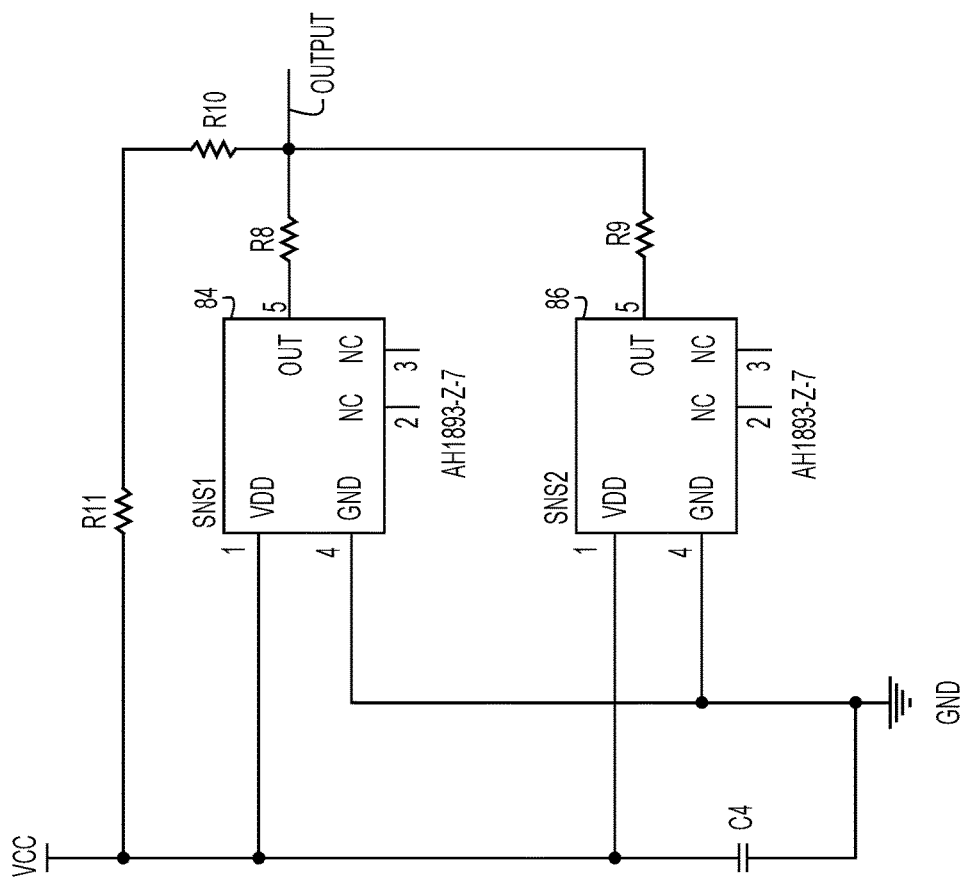
FIG. 4D is a schematic diagram illustrating a home and limit sensor circuit associated with a proportional pedal in accordance with embodiments presented herein.

FIG. 4D is a schematic diagram illustrating a circuit 98 that includes home sensor 84 and the limit sensor 86. As shown, the circuit 98 generates an analog output 99 having a level that changes depending on the output of the home sensor 84 and the limit sensor 86. As such, the level of the analog output 99 can be used to determine which one of the home sensor 84 and the limit sensor 86 is activated or, in certain examples, whether both are activated so as to indicate a failure condition.

Figure 5A:
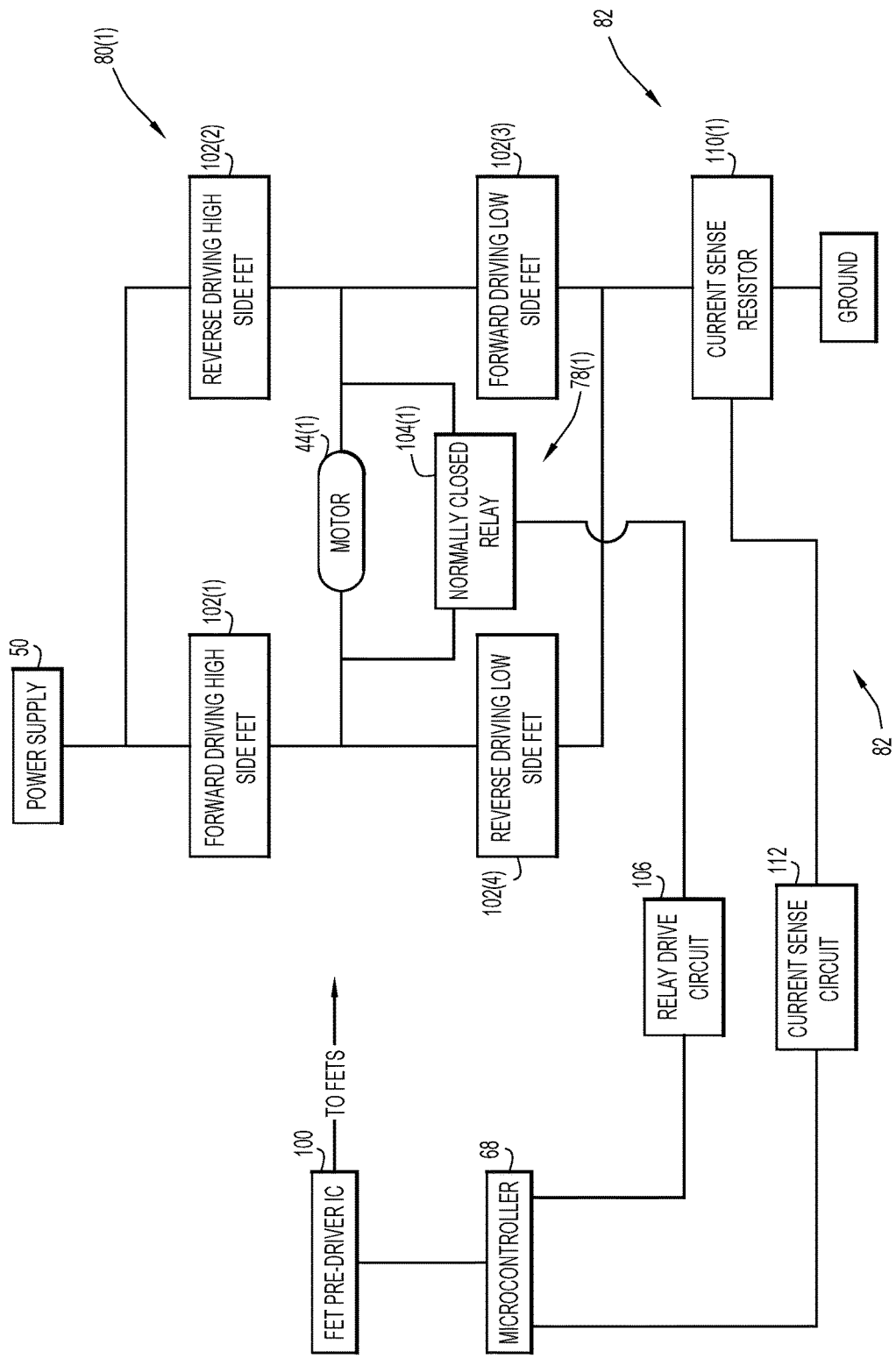
FIG. 5A is a block diagram illustrating an electronic safety brake in accordance with embodiments presented herein.

Another feature of the electronic drive system 26 is the electronic safety brake 78 that is configured to short one or more of the motors 44(1) and 44(2) when, for example, there is no power supplied to the electronic drive system 6 or when one or more failure conditions are detected. FIG. 5A is a block diagram illustrating one implementation of a portion of the electronic safety brake 78 for motor 44(1).

The portion of the electronic safety brake shown in FIG. 5A is referred to as electronic safety brake 78(1), which is used with H-bridge 80(1) (i.e., half of the dual H-bridge 80). As shown in FIG. 5A, H-bridge 80(1) is formed by four field-effect transistors (FETs) 102(1), 102(2), 102(3), and 102(4). Also as shown in FIG. 5A, the electronic safety brake 78(1) comprises a normally closed relay 104(1) and a relay drive circuit 106. As shown in the illustrative arrangement of FIG. 5B, the normally closed relay 104(1) comprises a switch 114 and an inductor coil 116. As noted, the relay 104(1) is a "normally closed" relay, meaning that the switch 114 has a default closed position when power is not being supplied to the relay drive circuit 106 in the appropriate manner. Stated differently, then switch 114 is opened only when an appropriate drive signal, such as a pulsed drive signal, is delivered to relay drive circuit 106. The switch 114 is opened in response to the energizing of coil 116. Therefore, when power is delivered to the electronic drive system 26 from battery assembly 48, the CPU 68 delivers a drive signal to the relay drive circuit 106, which in turn energizes the coil 116 to open switch 114. However, when no power is delivered to the electronic drive system 26 from battery assembly 48, the coil 116 is not energized and, as such, the switch 114 is closed.

Figure 5B:
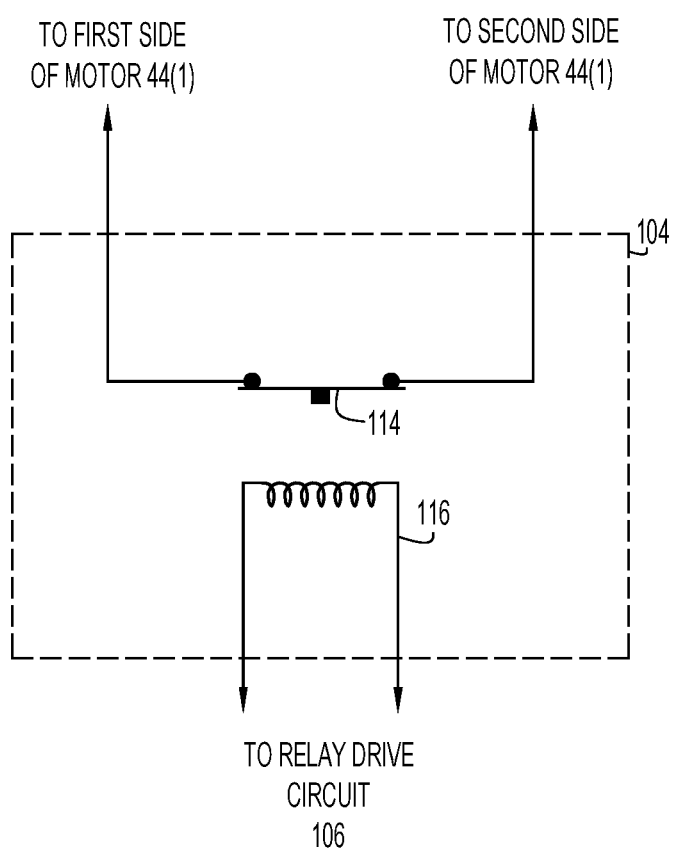
FIG. 5B is a schematic diagram illustrating details of a normally closed relay of an electronic safety brake in accordance with embodiments presented herein.

In the closed position, which is shown in FIG. 5B, the switch 114 "shorts" the two terminals of the motor 44(1) together so that the motor cannot be activated. Stated differently, when the switch 114 is closed, current or voltage does not flow through the motor (i.e., the relay is configured to prevent current or voltage flow through the motor in a non-powered state or in response to failure conditions). The same arrangement as that shown in FIGS. 5A and 5B may also be used to prevent actuation of motor 44(2).

The normally closed relay 104(1), which is comprised of switch 114 and the coil 116, is one arrangement that may be used for electronic safety brake 78(1). It is to be appreciated that, in other embodiments of the present invention, the normally closed relay 104(1) could be replaced with, for example, a depletion mode FET, an insulated-gate bipolar transistor (IGBT), or other electronic mechanism.

In general, the electronic safety brake 78 is a dual-use or dual-function system that serves two primary functions within the electronic drive system 26. First, electronic safety brake 78 operates as an electronic parking brake for the vehicle 10 that prevents activation of one or more of the motors 44(1) and 44(2) when the electronic drive system 26 is non-powered. For example, when power is removed from the system, the CPU 68 does not provide drive signals to relay drive circuit 106. As a result, the relay drive circuit 106 does not energize coil 116 and the switch 114 is closed to prevent current or voltage flow through the motor 44(1). This may be important because, in a typical H-bridge configuration, when the system is non-powered the FETs in the H-bridge do not conduct signals and thus cannot apply a braking mechanism to a motor. As a result, there is a danger that a non-powered vehicle driven with an H-bridge could roll. The inclusion of the electronic safety brake 78 allows the use of an H-bridge drive mechanism while preventing the non-powered vehicle 10 from rolling (i.e., locking the motors 44(1) and 44(2) independent from the H-bridge).

A second primary purpose of the electronic safety brake 78 is to operate as a failsafe mechanism to prevent a run-on condition for the motors 44(1) and 44(2). That is, referring specifically to the arrangement of FIGS. 5A and 5B, the switch 114, in addition to being closed when no power is delivered to the electronic drive system 26 from battery assembly 48, may also be closed when one or more fault conditions are detected. For example, the CPU 68 activates/drives the motor 44(1) by activating one or more of the FETs 102(1), 102(2), 102(3), and 102(4) via FET pre-driver integrated circuit (IC) 100. It is possible that the one or more of the FETs 102(1), 102(2), 102(3), and 102(4) could fail "on," meaning that current could be supplied to the motor 44(1), even though the CPU 68 has shutdown the FETs via the pre-driver IC 100. In such circumstances, the flow of current through the motor is referred to herein as a motor failure or run-on condition because the CPU 68 has instructed the H-bridge 80(1) to stop driving the motor. As such, the CPU 68 can cause relay drive circuit 112 to de-energize the coil 116 so as to close switch 114 and short together the terminals of the motor 44(1), thereby preventing the motor 44(1) from running.

In one specific embodiment, each FET in the H-bridge 80(1) may be monitored individually for characteristics indicating that the FET is not operating properly. However, in another embodiment, a motor run-on condition can be detected using the indirect wheel speed sensor 82. As described further below, the wheel speed sensor 82 is referred to herein as an "indirect" sensor because it does not directly measure the speed of an associated one or more wheels. Instead, the wheel speed sensor 82 is configured to perform one or more measurements that correspond to a speed or load of the motors 44(1) and/or 44(2). These measurements, when analyzed by the CPU 68, allow the CPU 68 to determine an estimate of the wheel speed (i.e., indirectly determine the wheel speed). Stated differently, the indirect wheel speed sensor 82 is an electronic sensor that measures the current through the motors 44(1) and 44(2) (at the outputs of the dual H-bridge 80) using, for example, a current sensing resistor. The wheel speed sensor 82 also measures the voltage across the motors 44(1) and 44(2). Based on the measured currents, voltages, and a known or measured motor resistance, the CPU 68 performs Electromotive force (EMF) calculations to determine the speeds of the motors 44(1) and 44(2) and, accordingly, determine the speed of the wheel(s) associated with each of the motors.

As shown, the indirect wheel speed sensor 82 comprises a current sense resistor 110(1) connected between the H-Bridge 80(1) and ground, and a current sense circuit 112. When the H-bridge 80(1) is activated and motor 44(1) is running, current passes through the current sense resistor 110(1). The current through the current sense resistor 110(1) is detected by the current sense circuit 112, which provides an indication of the sensed current to CPU 68. Therefore, when one or more of the FETs 102(1), 102(2), 102(3), and 102(4) fail on, current will continue to flow through motor 44(1) and, accordingly, through current sense resistor 110(1). A determination by the CPU 68 that current is flowing through current sense resistor 110(1), but that the CPU 68 has instructed the H-bridge 80(1) to stop driving the motor, indicates that a motor run-on condition has occurred.

Figure 6:
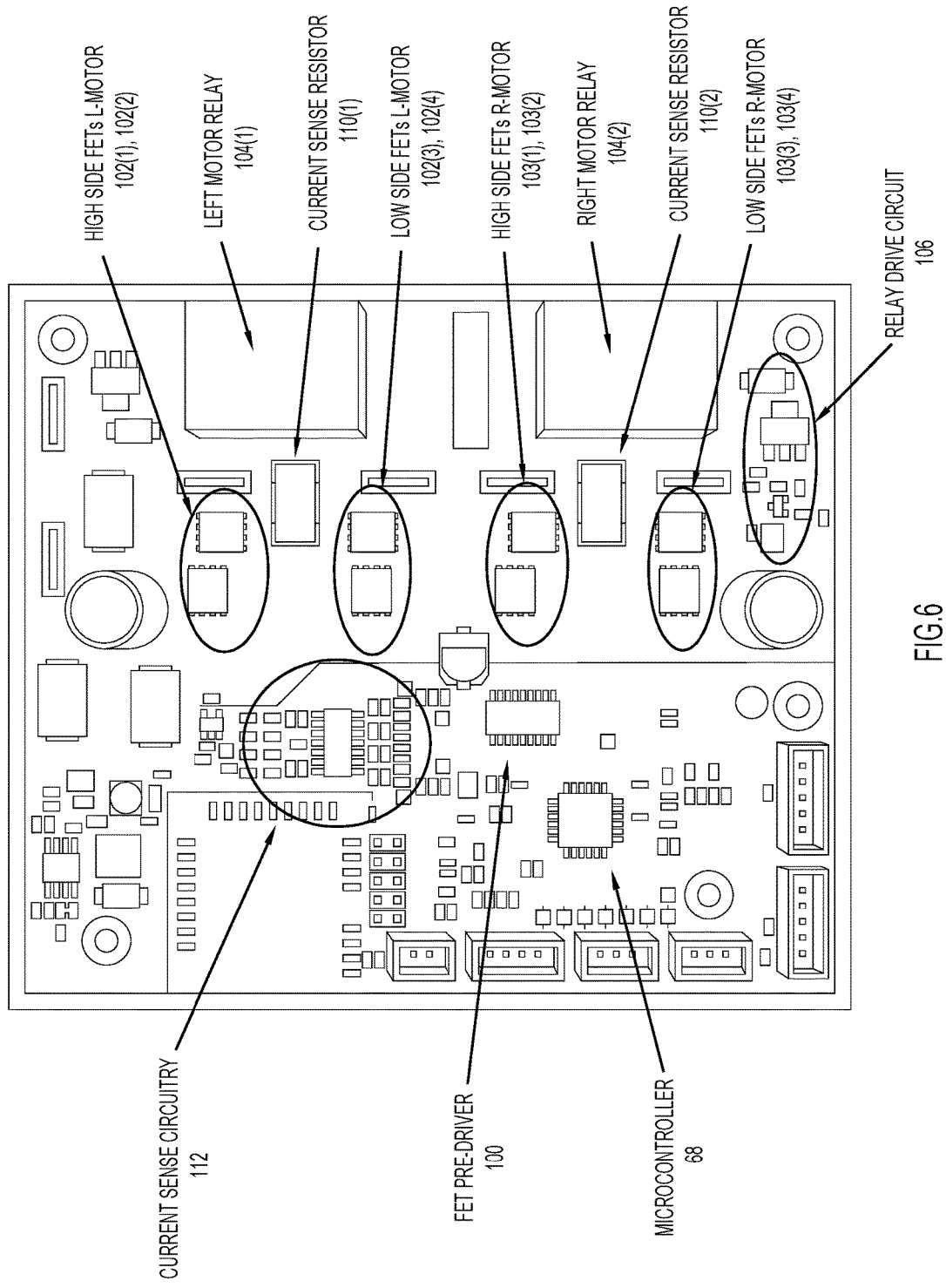
FIG. 6 is a top view of a circuit board arrangement for a portion of an electronic drive assembly in accordance with embodiments presented herein.

FIG. 6 is a top view of a circuit board arrangement for a portion of the electronic drive assembly 26. Illustrated in FIG. 6 is the dual H-bridge 80 formed by FETs 102(1), 102(2), 102(3), and 102(4) for driving the first motor 44(1) and FETs 103(1), 103(2), 103(3), and 103(4). Also shown in FIG. 6 is the normally closed relay 104(1) and current sense resistor 110(1) both associated with motor 44(1), and a second normally closed relay 104(2) and a current sense resistor 110(2) both associated with motor 44(2). FIG. 6 also illustrates the relay drive circuit 106, the current sense circuit (circuitry) 112, the FET pre-driver IC 100, and the microcontroller/CPU 68.

Figure 7A:
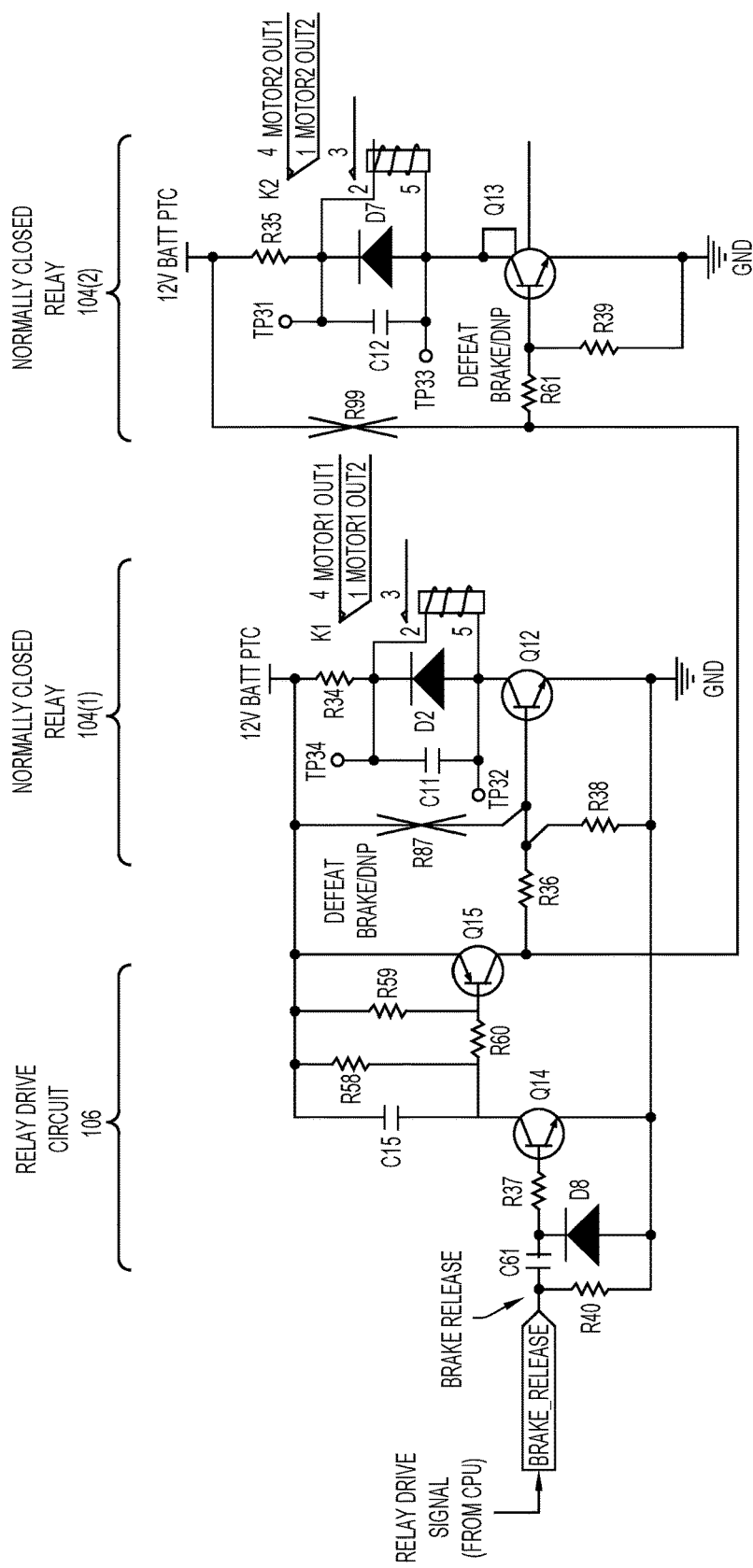
FIGS. 7A-7F are schematic diagrams illustrating further details for various elements of an electronic drive system in accordance with embodiments of the present invention.
Figure 7B:
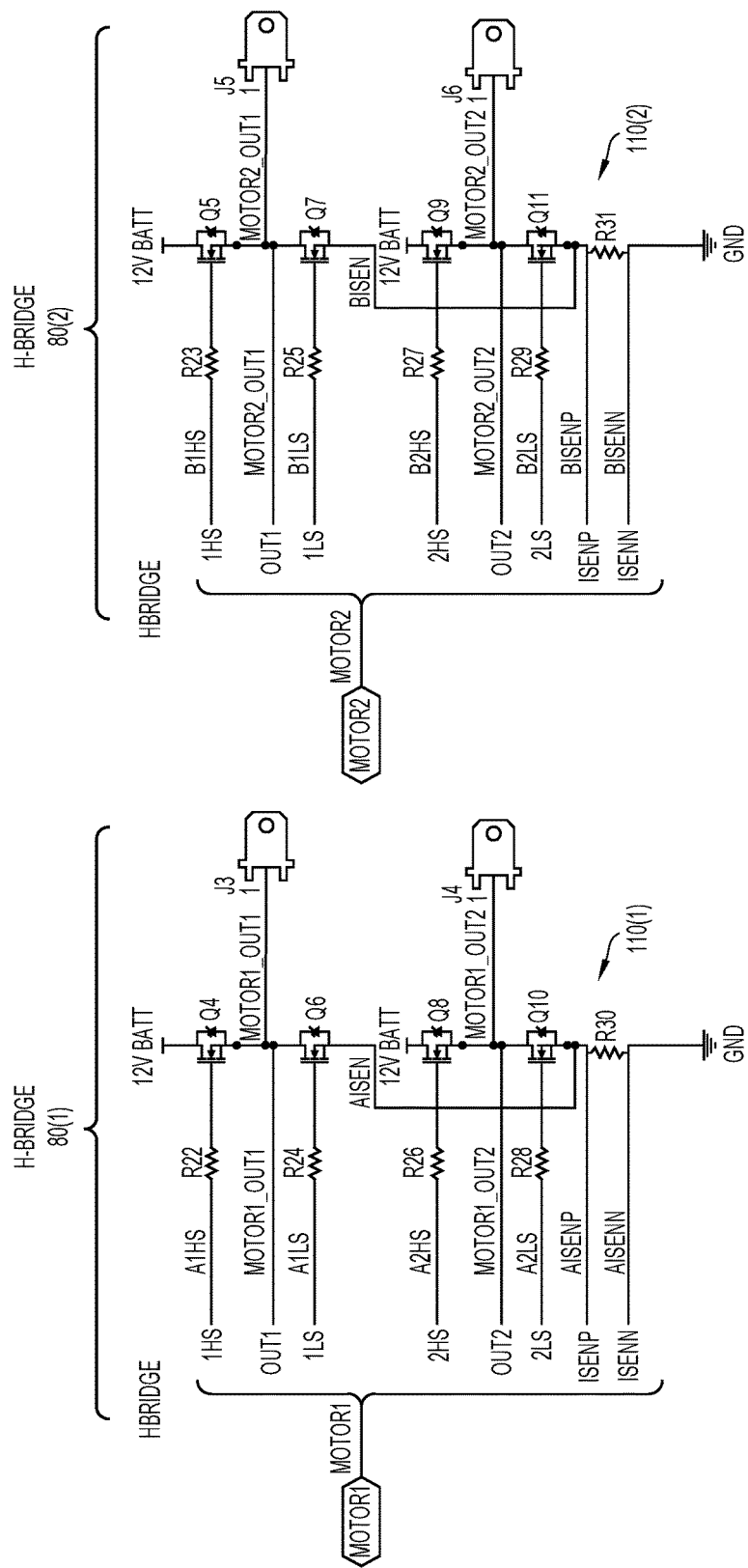

FIGS. 7A-7F are schematic diagrams illustrating further details for various elements of an electronic drive system 26 in accordance with embodiments of the present invention. More specifically, FIG. 7A is a schematic diagram illustrating one arrangement for the relay drive circuit 106, the normally closed relay 104(1), and the normally closed relay 104(2). FIG. 7B is a schematic diagram illustrating one arrangement for the dual H-bridge 80, comprising H-bridge 80(1) and 80(2). FIG. 7B also illustrates current sense resistors 110(1) and 110(2).

Figure 7C:
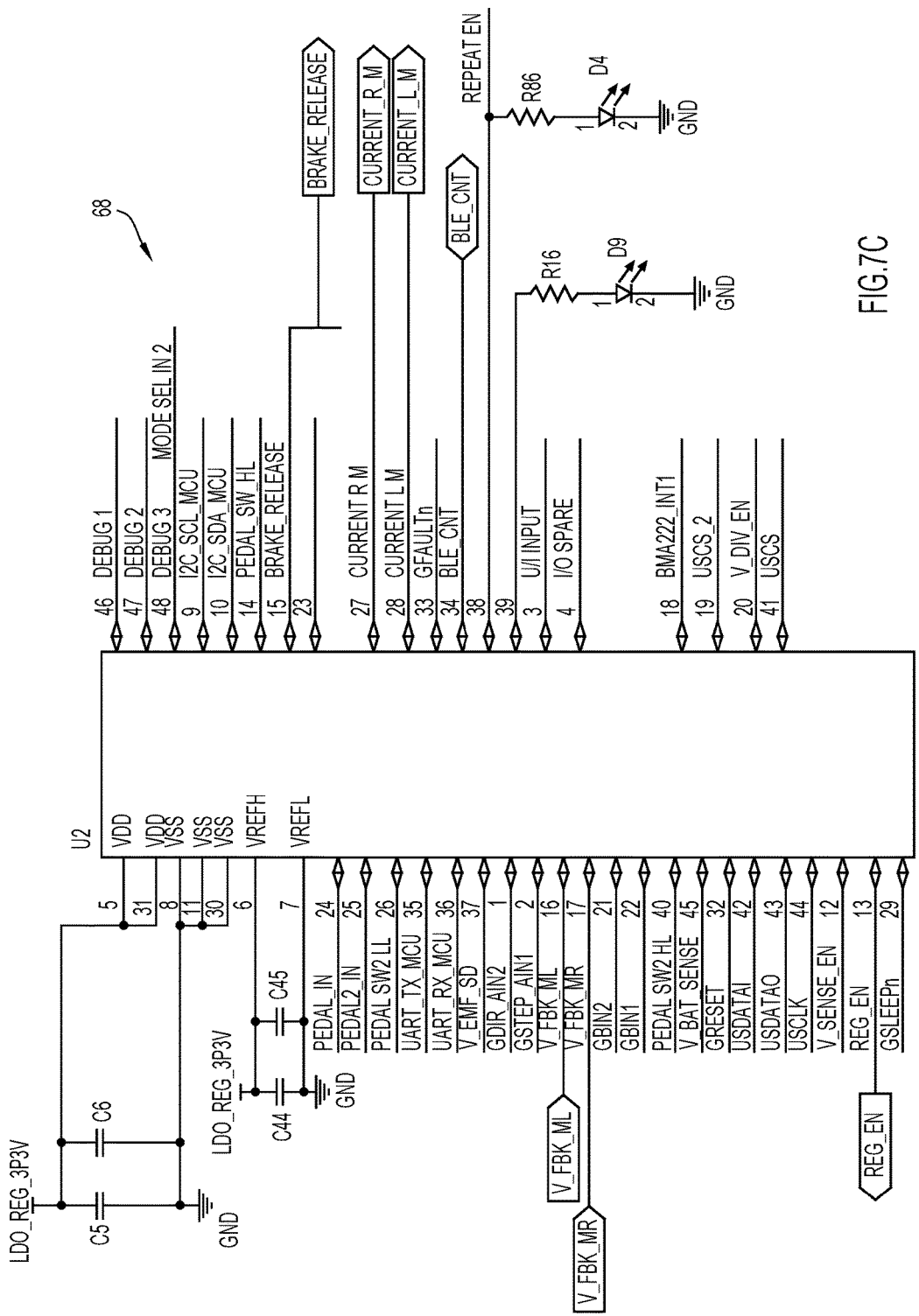
Figure 7D:
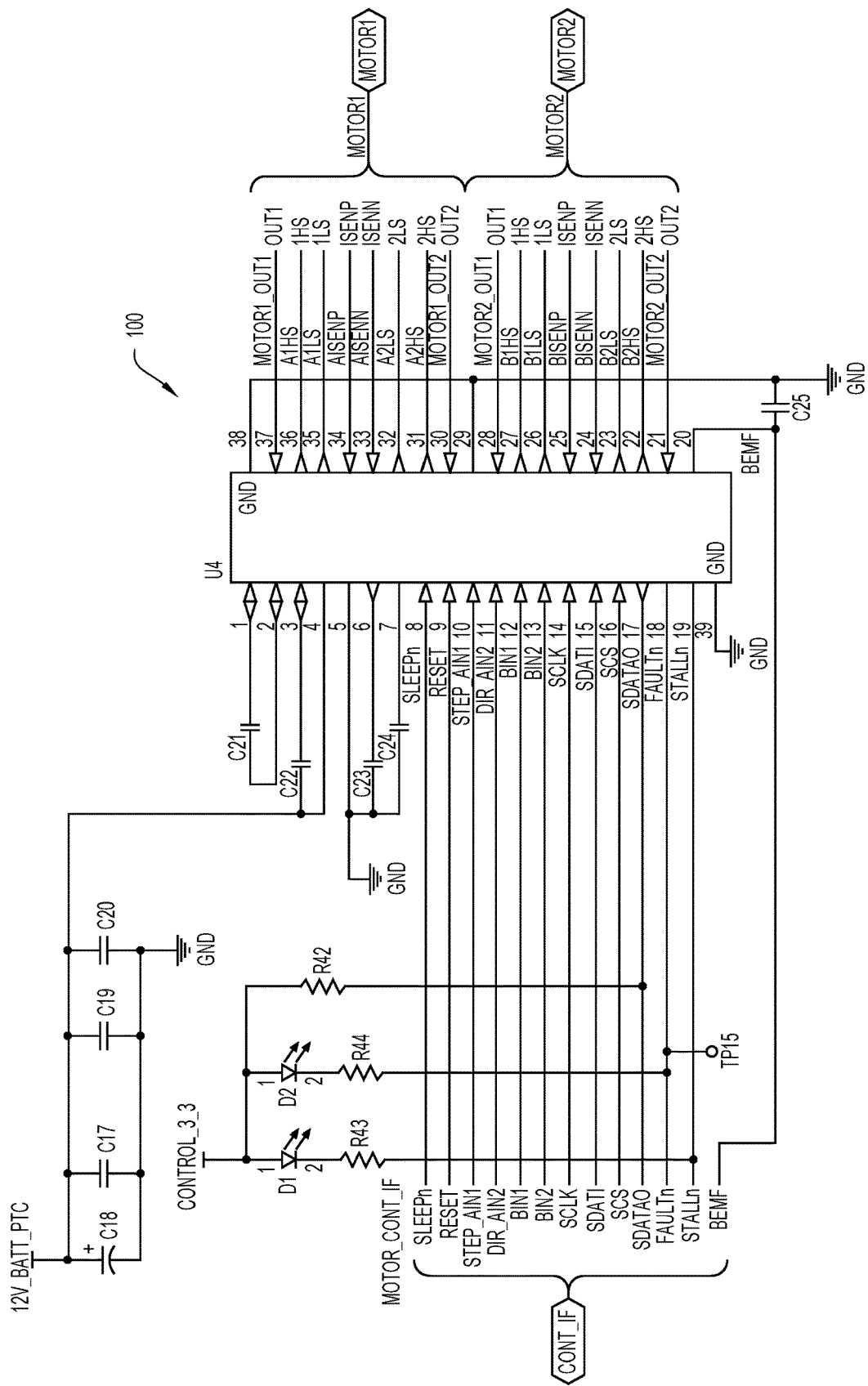
Figure 7E:
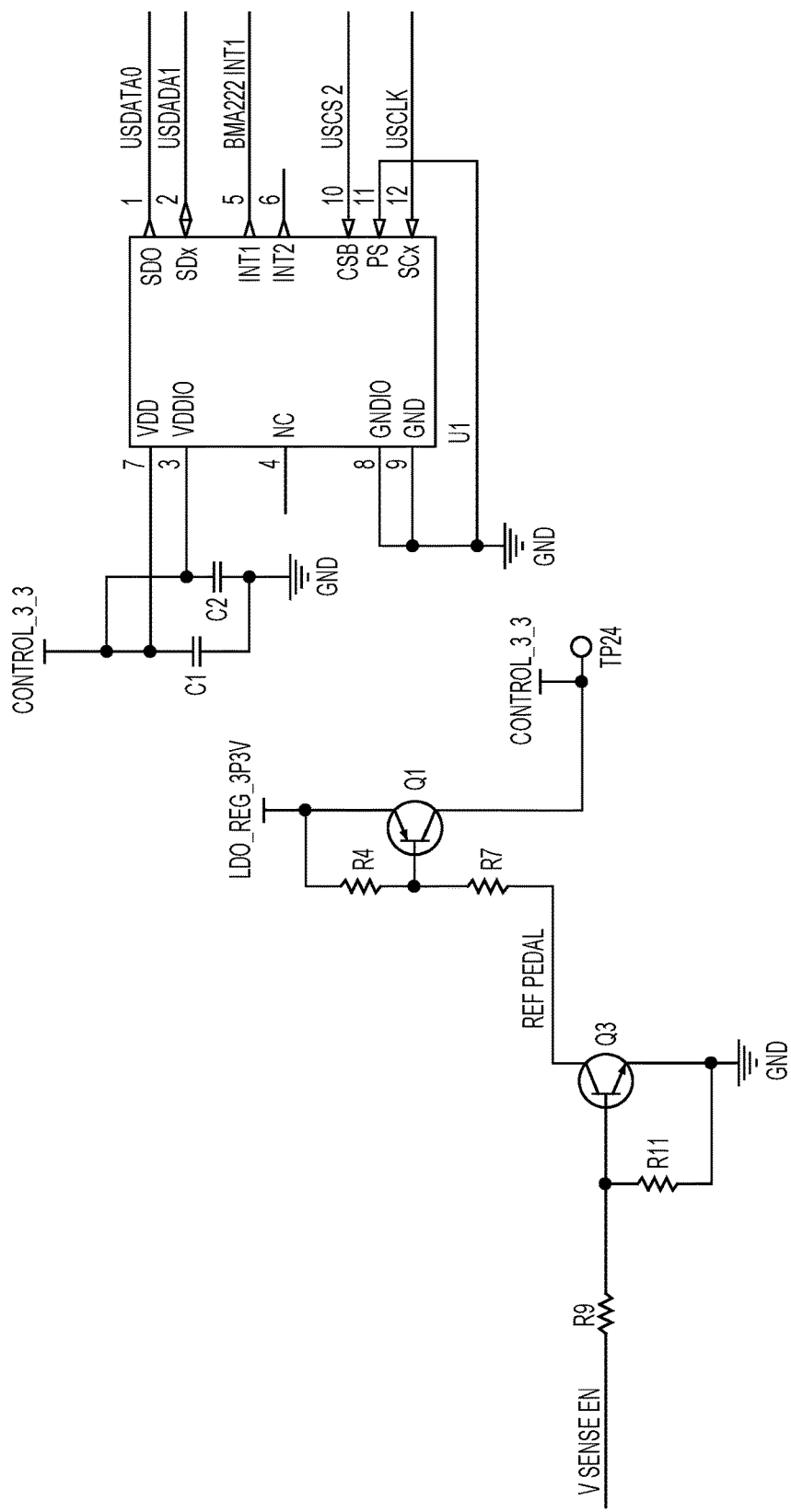

FIG. 7C is a schematic diagram illustrating one arrangement for the microcontroller/CPU 68, while FIG. 7D is schematic diagram illustrating one arrangement for the FET pre-driver IC 100. FIG. 7E is a schematic diagram illustrating one arrangement for a stability sensor 76 in the form of an accelerometer.

Figure 7F:
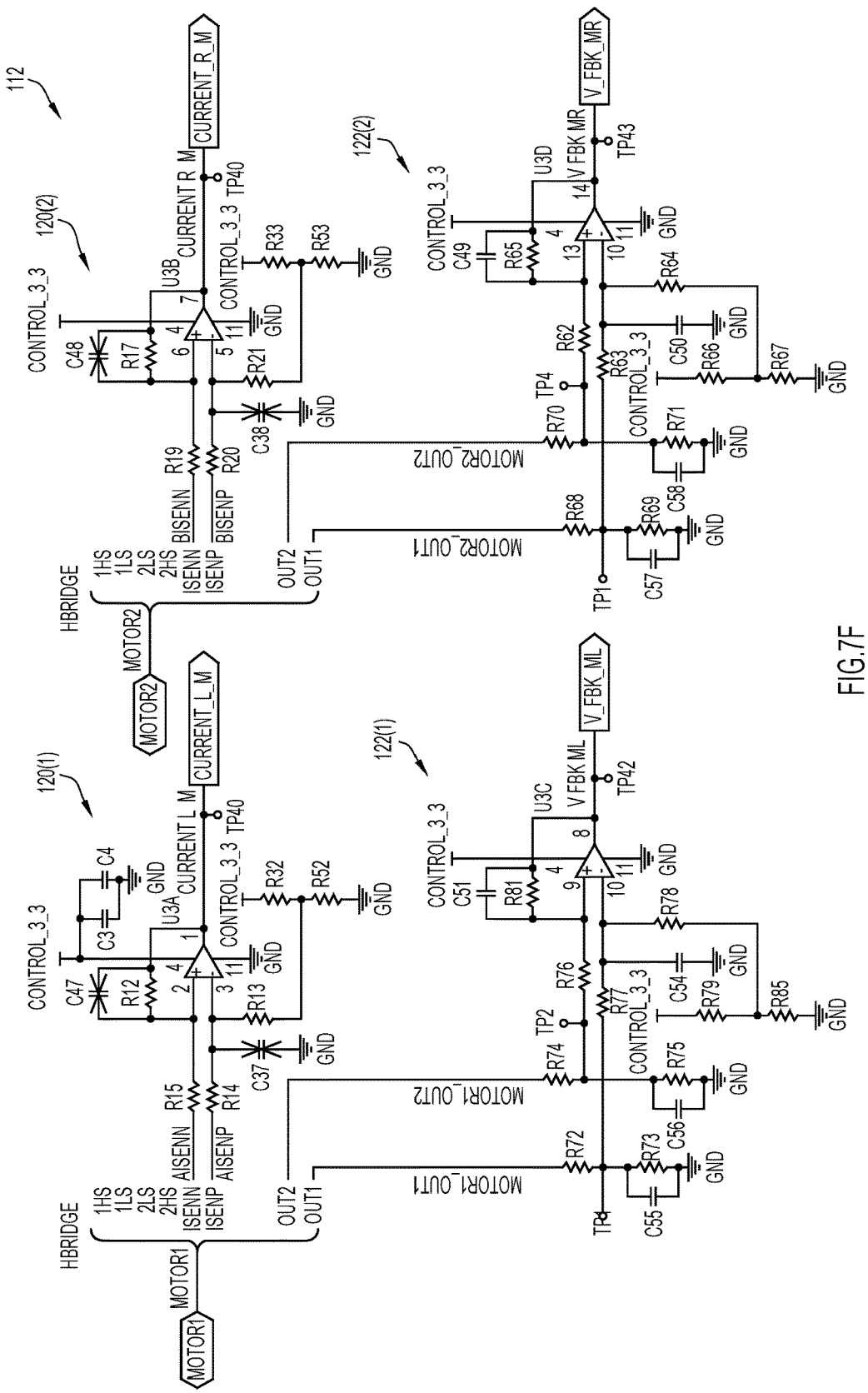

FIG. 7F is a schematic diagram illustrating one arrangement for a current sensor circuit 112 of an indirect wheel speed sensor 82, as described above. As noted, the indirect wheel speed sensor 82 is an electronic sensor that measures/determines the current through the motors 44(1) and 44(2) and the voltage across the motors 44(1) and 44(2). Based on the measured currents, voltages, and a known or measured motor resistance, the CPU 68 performs Electromotive force (EMF) calculations to determine the speeds of the motors 44(1) and 44(2). In the example arrangement of FIG. 7F, the current sensor circuit 112 includes four (4) portions/blocks, namely two current feedback blocks 120(1) and 120(2) associated with motors 44(1) and 44(2), respectively, and two voltage feedback blocks 122(1) and 122(2) associated with motors 44(1) and 44(2), respectively. The current feedback blocks 120(1) and 120(2) provide the CPU 68 with indications of the current through the current sense resistors 110(1) and 110(2), respectively. The voltage feedback blocks 122(1) and 122(2) provide the CPU 68 with indications of the voltage across the motors 44(1) and 44(2), respectively. The CPU 68 is aware of the resistance of each of the motors 44(1) and 44(2) and, given the current and voltage feedback provided by current sensor circuit 112, the CPU 68 can determine the power consumed and the speed of each of the motors 44(1) and 44(2). In other words, the CPU 68 electronically (indirectly) determines the speed of the motors 44(1) and 44(2) and, accordingly, the speed of the associated wheels.

Returning to FIG. 3, a still other feature of the electronic drive system 26 is the ability to provide stability control. In certain ride-on toy vehicles, the vehicle may experience stability issues, such as a possibility for the toy vehicle to roll over (forward/backwards or left/right) when operating on inclines or uneven surfaces. Therefore, as noted above, the electronic drive system 26 includes one or more stability sensors 76. The CPU 68 may use inputs from the stability sensor(s) 76, for example, slow or stop the vehicle 10 when stability issues are detected. The one or more stability sensors 76 may be, for example, an accelerometer or a gyroscope.

Another feature of the electronic drive system 26 is the ability to provide traction control. Certain ride-on toy vehicles have a rigid frame and no suspension. As such, the ability to end up with a subset (e.g., 3 out of 4) of the wheels on the ground is common, thereby causing the vehicle to get stuck. In the embodiments of the present invention, since motors 44(1) and 44(2) are independent controllable, the electronic drive system 26 can dynamically control how much power goes to each motor 44(1) and 44(2) (and thus control the power to each driven wheel). In accordance with embodiments presented herein, the traction control is enabled based on information from the indirect wheel speed sensor 82. More specifically, as noted above, the indirect wheel speed sensor 82 is configured to provide the CPU 68 with current and voltage measurements that can be analyzed by the CPU 68 to determine an estimate of the speed of the motors 44(1) and 44(2) and, accordingly, the speed of the wheels associated with each of the motors. If the CPU 68 determines, based on the signals from the wheel speed sensor 82, that one driven wheel is slipping/spinning (i.e., one motor is unloading), and/or that the other motor is loading, the electronic drive system 26 can transfer additional power to the motor that is loading to provide traction control. Additionally, inputs from the indirect wheel speed sensor 82 can be used by the CPU 68 to maintain a steady speed for the vehicle 10 when traversing uneven ground (e.g., increase power to a motor when loading is detected).

The indirect wheel speed sensor 82 can also be used to maintain vehicle speed on a downward incline. For example, a parent may select a speed of 2 MPH, but the vehicle 10 may start to accelerate down an incline. This condition can be detected through the data supplied by the indirect wheel speed sensor 82 and the CPU 68 can decrease the power to the motors 44(1) and/or 44(2) or operate them in a dynamic brake configuration to maintain the desired speed.

In one embodiment, the CPU 68 uses inputs from the indirect wheel speed sensor 82 to monitor the speed of the motors 44(1) and 44(2) and to determine when one of the motors is beginning to spin outside of a specified range (i.e., loading or unloading). If both motors 44(1) and 44(2) begin to slow down at approximately the same time, the CPU 68 may determine that the vehicle 10 has encountered an obstacle. In response, the CPU 68 may temporarily increase the power supplied to both motors 44(1) and 44(2) to traverse the obstacle.

The information from the wheel speed sensor 82 can also be used to ensure that the vehicle 10 operates within a predetermined safe operating range. For example, based on the current through the motors 44(1) and/or 44(2), it is possible for the CPU 68 to estimate the operating temperature of the motors and/or the components (e.g., the FETs) in the dual H-bridge 80. If the CPU 68 determines that the motors 44(1)/44(2) and/or the FETs have been driven with an amount of current that has likely raised the temperatures of the motors and/or FETs above a safe threshold, then the CPU 68 can reduce the power supplied to prevent or remediate overheating. In other words, the current through the motor 44(1) and/or 44(2) can be used to characterize operation of the motors.

In certain embodiments, the electronic drive system 26 has the ability to measure the ambient temperature. The measured ambient temperature may be taken in account when determining whether or not the motors 44(1) and/or 44(2) are operating within a predetermined safe operating range. For example, if it is determined that the ambient temperature is 105 degrees Fahrenheit (F), the electronic drive system 26 may reduce the upper threshold of the operational range of the vehicle 10.

As noted above, the electronic drive system 26 may also include a battery monitoring circuit 72. The battery monitoring circuit 72 is configured to measure the voltage of the battery input and provide the CPU 68 with an indication of the actual battery voltage level. If, based on signals received from the battery monitoring circuit 72, the CPU 68 determines that the battery voltage is outside of a predicated range, the CPU can initiate one or more corrective actions (e.g., prevent operation of the vehicle 10, provide a warning to a user, etc.).

In certain embodiments, the proportional pedal 56 and steering mechanism 38 may be replaced by two hand-activated steering levers that each control one of the two motors 44(1) and 44(2). Such an arrangement may be used, for example, in so-called "zero-turn" vehicles, vehicles that use tracks/treads, etc. For example, with the electronic drive system 26, steering levers could be use to drive a wheel or a combination of wheels (e.g., connected by a track/tread) on one side of the vehicle forward and to drive a wheel or a combination of wheels on the other side of the vehicle in reverse (i.e., use steering levers with two motors and two wheels, two motors and four wheels, four motors and four wheels, etc.).

One potential danger associated with the use of steering levers is that a child may grab the levers to support himself/herself while entering or exiting the vehicle 10, thereby causing the vehicle 10 to begin movement. Therefore, in certain embodiments, the electronic drive system 26 includes an occupant sensor 75 that prevents activation of the motors 44(1) and 44(2) until the child is properly seated in the seat 16. That is, the occupant sensor 75 provides an input to the CPU 68 that causes the CPU to lock the motors until the sensor indicates that the child is seated. The occupant sensor 75 may comprise, for example, a Bend Sensor®, a strain gauge, a capacitive sensor, a resistive sensor, a heat sensor, or another mechanism capable of providing an input to the CPU 68 indicating that the child is seated in seat 16.

In certain arrangements, the electronic drive system 26 is configured to perform data logging operations. For example, the CPU 68 may be configured to store data in memory 66 that represents the last operational state of the vehicle 10, the operations performed by the vehicle 10 for a recent period of time, etc. In certain embodiments, the logged data is continually/periodically updated so that only a recent time period or number of operations is captured. This logged data may be useful to, for example, debug failure modes observed during use of the vehicle 10.

As noted above, user interface 54 is formed by a plurality of user input devices. In certain embodiments, one of the user input devices is a speed interface that allows a user (e.g., a parent) to set the speed and/or acceleration of the vehicle 10. In one specific example, the speed interface has settings of 1, 2, 3, 4, and 5 which correlate to speeds of 1, 2, 3, 4, and 5 miles-per-hour (MPH). Once the max speed of the vehicle 10 is set using the speed interface, the electronic drive system 26 will limit the vehicle to that speed across all terrains, including on down slopes.

The user interface 54 may also include one or more displays that provide information to a user. One example display is a battery "gauge" that provides an indication of the amount of energy remaining available in the battery. More specifically, the CPU 68 may use information from the battery monitoring circuit 72, as well as logged/stored information about the usage of the vehicle (i.e., time since last battery charge, duration of last battery charge, driving conditions, etc.) to actively estimate/predict the amount of energy remaining in the battery.

In certain embodiments, the electronic drive system 26 is configured to provide enhanced audio output during use of the vehicle 10. In particular, the electronic drive system 26 may be configured to output sound signals using an amplifier 92 and a speaker 94 in a pattern that follows the speed of the motors 44(1) and 44(2). More specifically, shown in memory 66 are a plurality of engine audio samples 96(1)-96(N). The CPU 68 is configured to mix and play various combinations of these engine audio samples and pitch them either proportionally to the pedal or to the vehicle speed (e.g., a number of small files are blended to that give the effect of the motor speeding up or slowing down).

In one example sequence, the child presses the "on" button and the CPU 68 causes the speaker 94 to output an engine "start-up" audio sample. The system may then enter an audio loop where the CPU 68 plays an "engine idle speed" audio sample. When the child presses the pedal 56, the CPU 68 may pitch the engine ideal speed sample up until a threshold is reached. At that threshold, the CPU 68 adds/mixes one or more other audio samples that make it sound like the engine is continued to increase revolutions (i.e., "rev-up"). The CPU 68 can play a mix of audio samples to sound like the engine is revving, before moving into an "engine running" audio sample only. Additionally sample mixing may occur when the child removes pressure from the pedal (e.g., rev-down sound) until the vehicle 10 stops (i.e., plays the engine idle audio sample). The CPU 68 may also play a shutdown sound (e.g., go from idle to shut down) to play other sounds (e.g., a squealing sound).

The enhanced audio may, in certain examples, be initiated/triggered based on the information from the indirect wheel speed sensor 83. That is, the mixing of sounds to create, for example, rev-up or rev-down sounds is based on the speed of the motors 44(1) and/or 44(2) determined using (EMF calculations, rather than actuation of the pedal. Accordingly, sounds can be mixed and played so as to generally follow the actual (determined) loading or unloading of the motors 44(1) and/or 44(2). Stated differently, the CPU 68 may be configured to use EMF calculations to initiate a playback of one or more sound samples in response to detected loading or unloading of the motor(s). This provides an interactive sound experience for the child.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, terms such as "first," "second," "third," etc., merely identify one of a number of portions, components and/or points of reference as disclosed herein, and do not limit the present invention to any particular configuration or orientation.

What is claimed is:

1. A children's ride-on vehicle, comprising:
    a battery-powered motor assembly comprising at least one motor;
    a driven wheel assembly that includes at least one wheel adapted to be rotationally driven by the at least one motor of the motor assembly; and
    an electronic drive assembly comprising a proportional control drive actuator configured to provide an indication of a degree that the proportional control drive actuator has been activated by a user of the ride-on vehicle,
    wherein the degree that the proportional control drive actuator has been activated is used to set a speed of the at least one motor based on a variable voltage of the proportional control drive actuator, wherein the variable voltage maintains a constant current in the proportional control drive actuator as an electrical resistivity of the proportional control drive actuator changes depending on the degree that the proportional control drive actuator has been activated.

2. The children's ride-on vehicle of claim 1, wherein the proportional control drive actuator comprises a moveable component configured to be activated by the user and an analog sensor mechanically coupled to the moveable component so as to sense a degree of travel of the moveable component.

3. The children's ride-on vehicle of claim 2, wherein the electronic drive assembly further comprises a home sensor configured to provide an indication of when the moveable component is not actuated by the child.

4. The children's ride-on vehicle of claim 2, wherein the electronic drive assembly further comprises a limit sensor configured to provide an indication of when the moveable component has reached a maximum displacement.

5. The children's ride-on vehicle of claim 2, wherein the degree of travel of the moveable component is a percentage of the total available travel of the moveable component.

6. The children's ride-on vehicle of claim 1, wherein the proportional control drive actuator comprises a proportional pedal.

7. The children's ride-on vehicle of claim 1, further comprising first and second proportional control drive actuators, wherein the first and second proportional control drive actuators are each hand-activated steering levers.

8. The children's ride-on vehicle of claim 1, further comprising:
 a steering assembly having a steering mechanism positioned for actuation by the user and operatively connected to the driven wheel assembly to transmit user-selected steering inputs to the driven wheel assembly.

9. A children's ride-on vehicle, comprising:
 a motor assembly comprising at least one motor;
 a driven wheel assembly that includes at least one wheel adapted to be rotationally driven by the at least one motor of the motor assembly;
 an electronic drive assembly comprising a microcontroller and at least one electronic safety brake that includes a normally closed relay; and
 a battery configured to provide power to the electronic drive assembly,
 wherein the normally closed relay is configured to short the at least one motor when no power is provided from the battery to the electronic drive assembly.

10. The children's ride-on vehicle of claim 9, wherein the electronic safety brake further includes a relay drive circuit.

11. The children's ride-on vehicle of claim 10, wherein the normally closed relay comprises a switch and an inductor, wherein the switch has a default closed position, and wherein the switch is configured to open only when the inductor is energized by the relay drive circuit.

12. The children's ride-on vehicle of claim 9, wherein the electronic safety brake comprises at least one of a depletion mode field-effect transistor (FET) and an insulated-gate bipolar transistor (IGBT).

13. The children's ride-on vehicle of claim 9, wherein the electronic drive assembly comprises at least one indirect wheel speed sensor configured to measure the current through the at least one motor and to determine a voltage across the at least one motor.

14. The children's ride-on vehicle of claim 13, wherein the microcontroller is configured to perform Electromotive force (EMF) calculations based on the current through the at least one motor, the voltage across the at least one motor, and a known or measured motor resistance to determine a speed of the at least one motor.

15. The children's ride-on vehicle of claim 14, wherein the at least one motor comprises first and second motors, and wherein the at least one indirect wheel speed sensor is configured to measure the current through each of the first and second motors and to determine the voltage across each of the first and second motors, and wherein the microcontroller is configured to perform EMF calculations to determine respective speeds of the first and second motors.

16. The children's ride-on vehicle of claim 15, wherein the microcontroller is configured to execute a traction control mechanism to dynamically control distribution of power between the first and second motors based on the respective speeds of the first and second motors.

17. The children's ride-on vehicle of claim 14, wherein the microcontroller is configured to detect at least one of loading or unloading of the at least one motor based on the current through the at least one motor and the voltage across the at least one motor, and is configured to initiate a playback of one or more sound samples in response to detected loading or unloading of the at least one motor.

18. A children's ride-on vehicle, comprising:
 a motor assembly comprising at least one motor;
 a driven wheel assembly that includes at least one wheel adapted to be rotationally driven by the at least one motor of the motor assembly;
 an electronic drive assembly comprising a microcontroller and at least one dual-function electronic safety brake; and
 a battery configured to provide power to the electronic drive assembly,
 wherein the microcontroller is configured to:
  determine whether the microcontroller is causing the battery to provide power to the electronic drive assembly;
  determine whether there is current through the at least one motor; and
  if it is determined that the microcontroller is not causing the battery to provide power to the electronic drive assembly, and if it is determined that there is current through the at least one motor, prevent the current through the at least one motor.

19. The children's ride-on vehicle of claim 18, wherein the electronic drive assembly comprises at least one indirect wheel speed sensor configured to measure the current through the at least one motor and to determine a voltage across the at least one motor.

20. The children's ride-on vehicle of claim 19, wherein the microcontroller is further configured to determine that the at least one motor is rotating based on voltage across the at least one motor.

21. A children's ride-on vehicle, comprising:
 a motor assembly comprising at least one motor;
 a driven wheel assembly that includes at least one wheel adapted to be rotationally driven by at least one motor of the motor assembly;
 an electronic drive assembly comprising a microcontroller and at least one electronic safety brake; and
 a battery configured to provide power to the electronic drive assembly,
 wherein the electronic drive assembly comprises at least one indirect wheel speed sensor configured to measure a current through the at least one motor and to determine a voltage across the at least one motor.

* * * * *